United States Patent [19]

McCowin et al.

[11] Patent Number: 4,877,471
[45] Date of Patent: Oct. 31, 1989

[54] METHOD AND APPARATUS FOR DELIVERING A RESIN-IMPREGNATED, MULTIFILAMENT BAND

[75] Inventors: Peter D. McCowin, Federal Way, Wash.; Brent R. Meredith, Fullerton, Calif.

[73] Assignee: The Boeing Company, Seattle, Wash.

[21] Appl. No.: 643,772

[22] Filed: Aug. 24, 1984

[51] Int. Cl.$^4$ .............................................. B32B 27/02
[52] U.S. Cl. ...................................... 156/181; 156/441
[58] Field of Search ............... 156/166, 169, 175, 173, 156/172, 433, 441, 181; 364/131; 38/190, 194; 242/157 R; 226/190, 189, 185, 188, 186, 178, 181, 183

[56] References Cited

U.S. PATENT DOCUMENTS

| | | | |
|---|---|---|---|
| 3,112,234 | 11/1963 | Krupp | 156/169 |
| 3,258,378 | 6/1966 | Kelsey | 156/161 |
| 3,617,414 | 11/1971 | Wesch | 156/169 |
| 3,629,028 | 12/1971 | McLarty et al. | 156/289 |
| 4,129,468 | 12/1978 | Knab | 156/148 |
| 4,292,108 | 9/1981 | Weiss et al. | 156/361 |

FOREIGN PATENT DOCUMENTS

WO00351 2/1984 PCT Int'l Appl. ................. 156/181

Primary Examiner—Michael Ball
Attorney, Agent, or Firm—James P. Hamley; B. A. Donahue

[57] ABSTRACT

Each of a plurality of multifilament, resin-impregnated rovings (18) is routed through orthogonally disposed guide rollers (222, 224; 242,244) for compaction to a predetermined width and thickness between the radial faces of a compaction backup roller (250) and a compaction roller (254). The force applied to the compaction roller (254) is varied to assure the dimensions of each compacted roving. The compacted rovings (18) are then routed through a bandwidth adjustment assembly (290) that controls the spacing between adjacent rovings such that they emerge in a side-by-side alignment forming a band (90). The band (90) then passes over the surface of a final deliver roller (296) before being wound onto a rotating mandrel (92) in a band edge-to-edge configuration to form a filament-aligned structure. The structure is then cured, causing the flow of the resin impregnation and forming a unified structure.

42 Claims, 6 Drawing Sheets

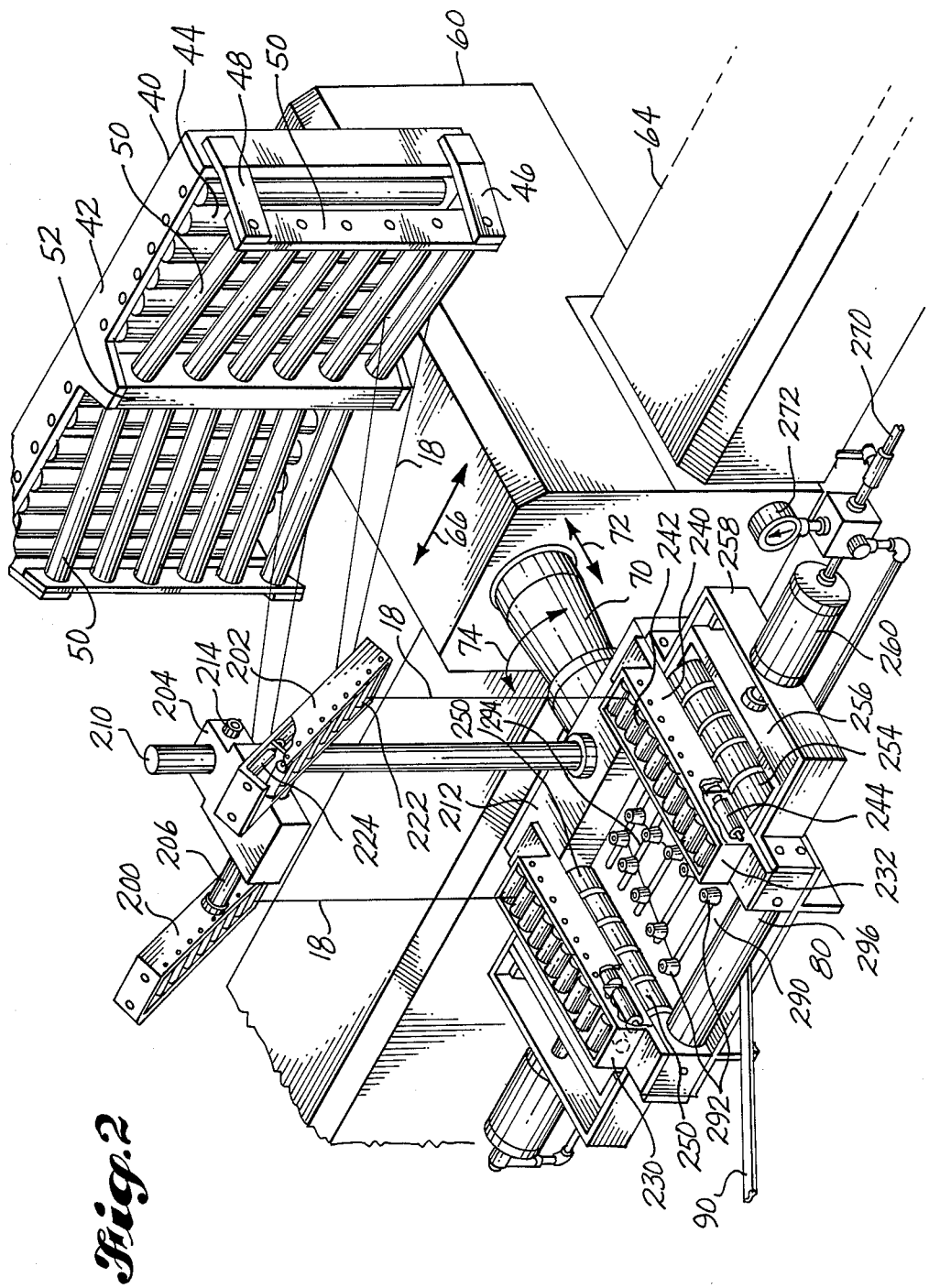

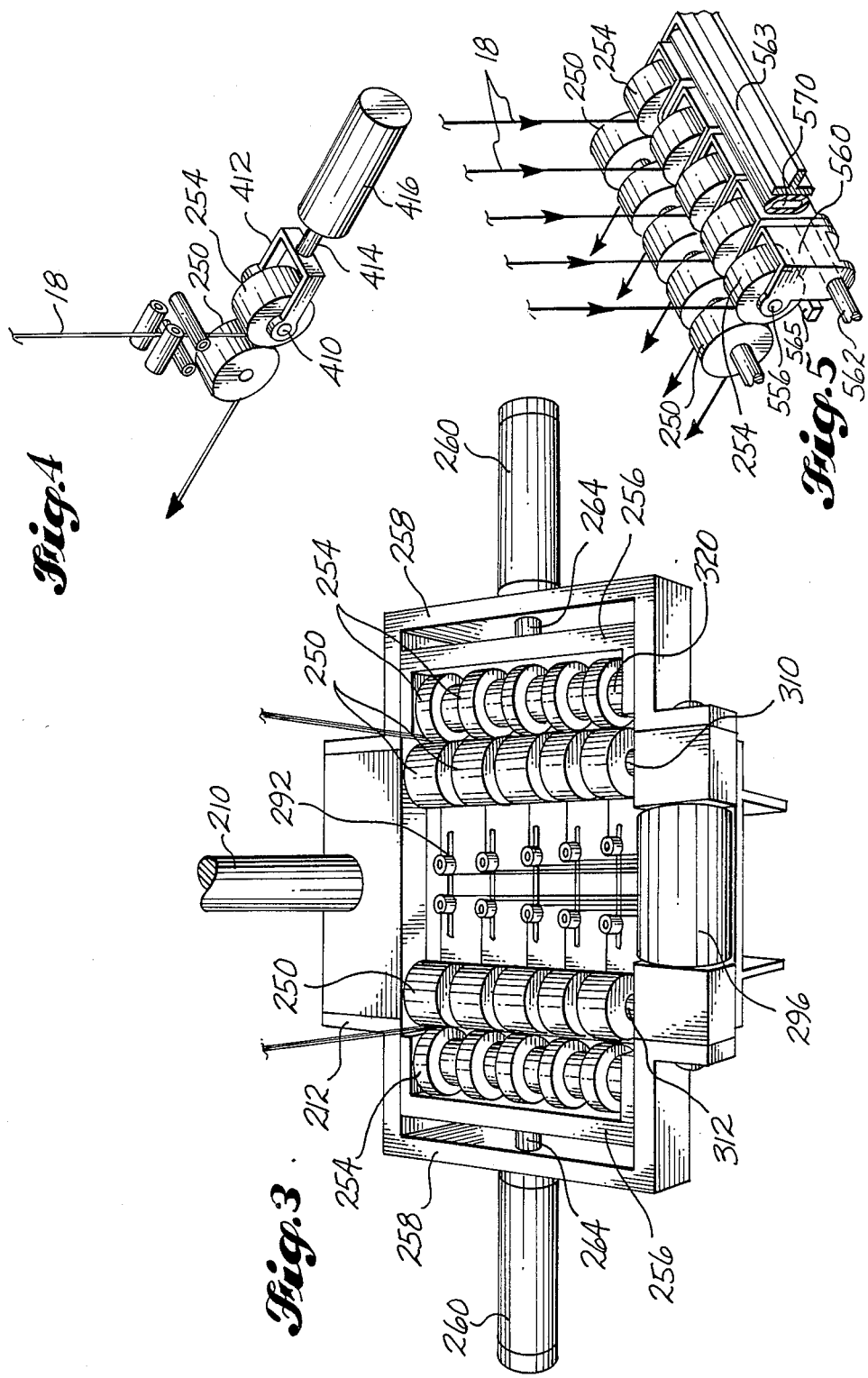

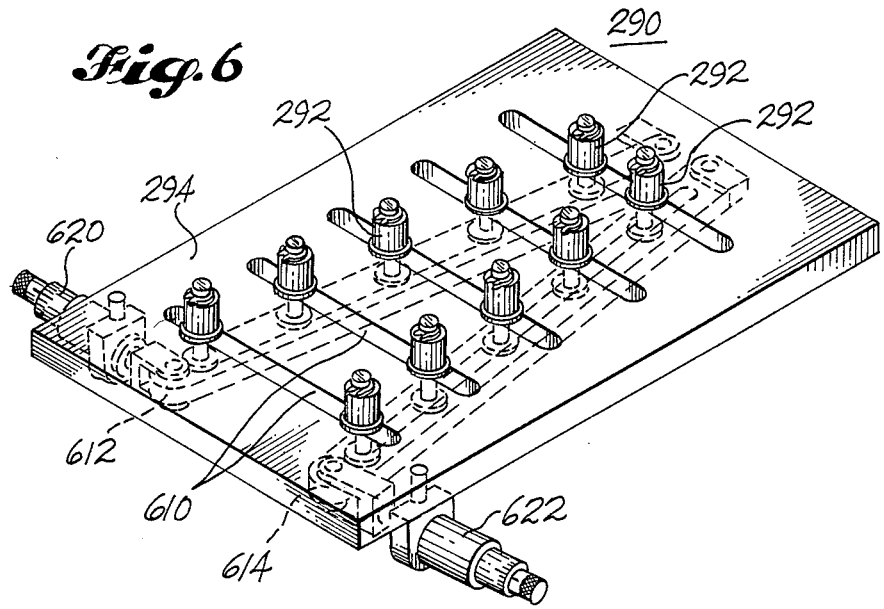
Fig. 6
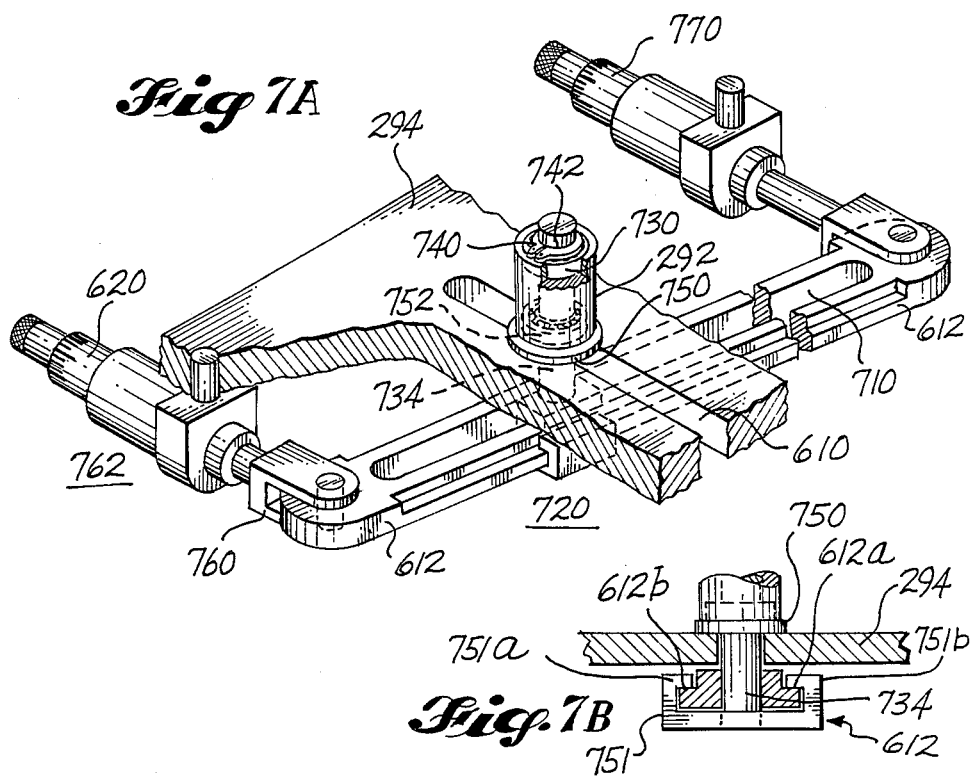
Fig. 7A
Fig. 7B

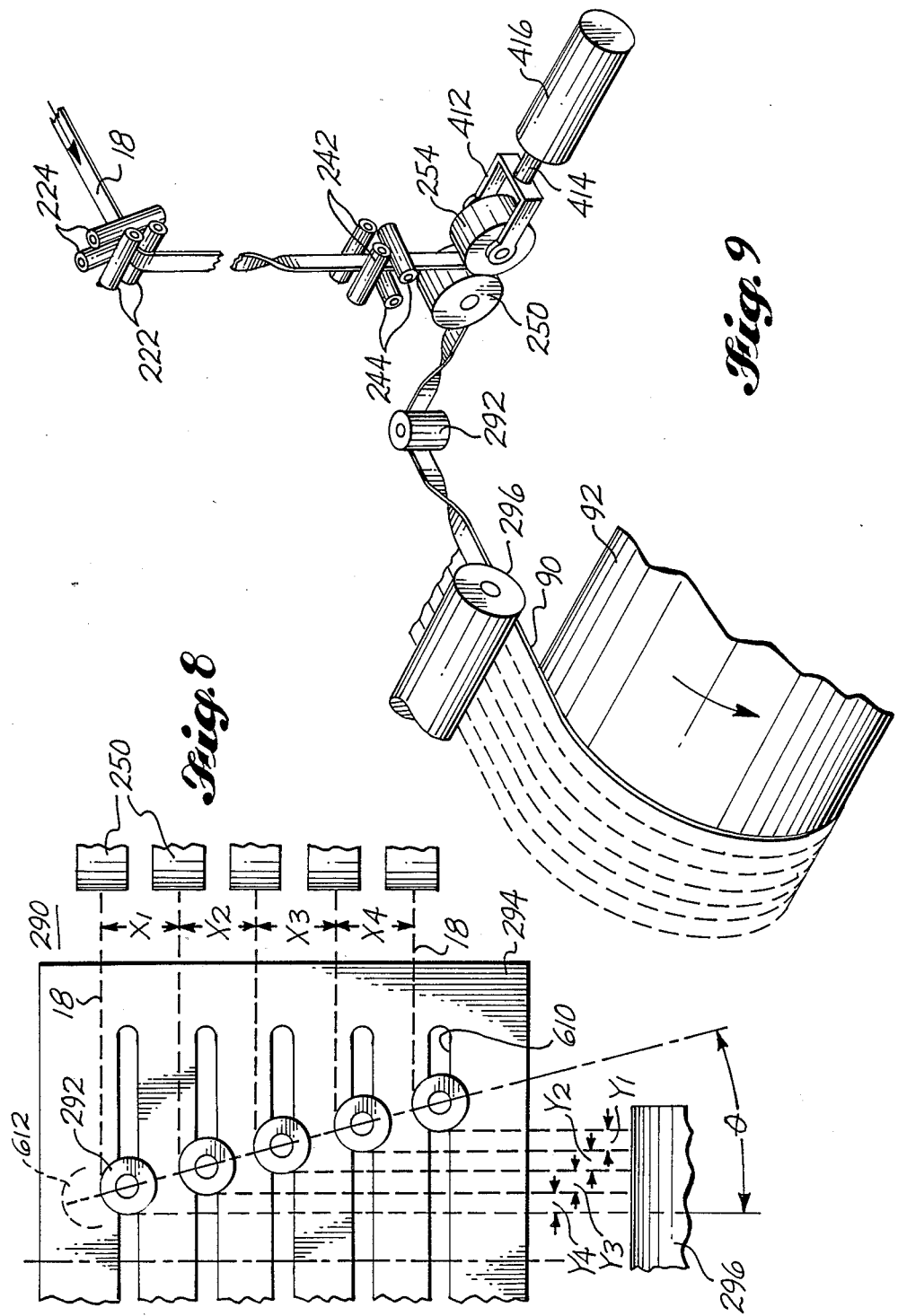

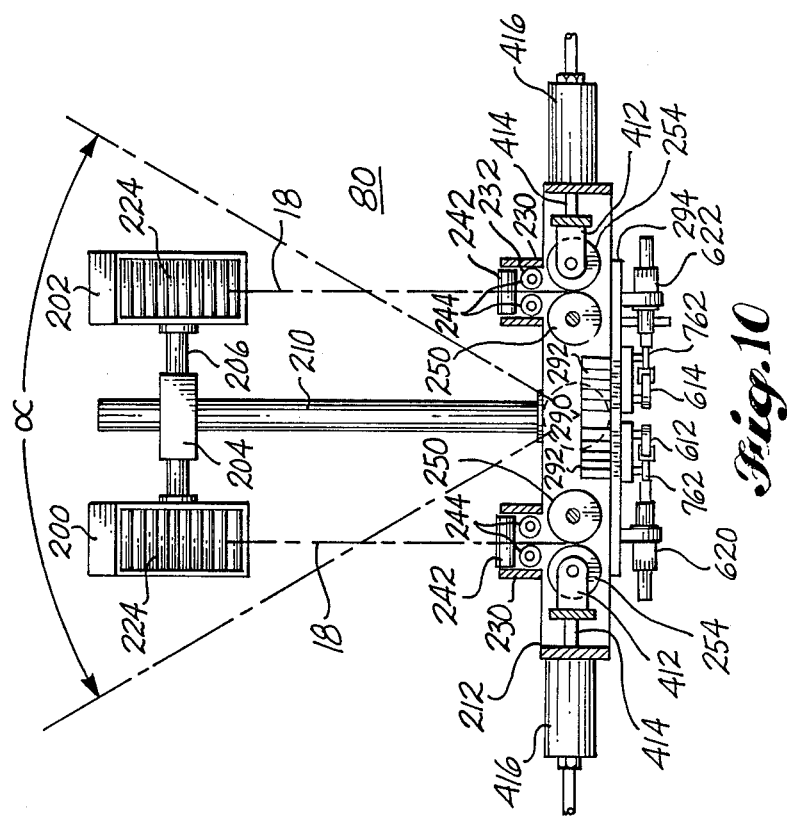

METHOD AND APPARATUS FOR DELIVERING A RESIN-IMPREGNATED, MULTIFILAMENT BAND

BACKGROUND OF THE INVENTION

The present invention pertains to the composite structure manufacturing art and, more particularly, to a method of, and apparatus for, forming and delivering a multifilament band to a receiving surface.

Composite material technology provides a means to fabricate a high-strength, low-weight structure. Such technology finds particular application in the aerospace industry.

At present, three principal composite manufacturing methods are practiced. These include tape lay-up, cloth or woven broad good lay-up, and filament winding. Each of these manufacturing techniques exhibits serious limitations, as is discussed below.

Tape lay-up composite material manufacturing is comprised of the laying of sections of tape side-by-side, or in an overlapped relationship, to form the composite structure. This lay-up may be accomplished manually, with mechanical assist, or by fully automatic tape lay-up machines. The fabrication of complex shapes, such as corners, bevels and tapered sections, is a tedious process using the tape lay-up method. Often, successive tape sections must be of different widths and/or lengths. A certain amount of overlap often occurs, which is undesirable.

In addition, where the tape is required to form a compound-curved surface, undesirable tape buckling occurs on the edge having the smallest radius of curvature. Further, where changes in direction are required, the tape must be cut and spliced to avoid buckling.

In addition, ply thickness is fixed for a given tape. If changes in either ply thickness or tape width are required, the process must be interrupted to change tape spools.

Close tolerance cloth broad good lamination is difficult to mechanize or automate. Further, cutting out contours and laminating these contour shapes is a cost-intensive procedure and often realizes significant material trim losses. In addition, design compromises must be made due to the inability to select any desired fiber angle and the requirement to shingle layer to obtain tapers.

To make optimum use of the potential of composite materials, the filament should be consistently and accurately aligned in the direction of the loads being carried, with the quantities of filaments being consistently matched to the load requirements. This requirement can be met relatively easily when the structure and load pattern are geometrically simple.

Industry-wide, a limited amount of work has been accomplished in the development of a preimpregnated graphite fiber delivery system specifically for filament winding aircraft quality structures. Standard filament winding practices seldom require the manufacturing quality control required for aircraft structural parts. Resin content control, fiber bandwidth control, and bandwidth thickness must all be addressed for filament winding to be useful in aircraft composite structures.

In most cases, the filament winding methods presently used in industry to wind with preimpregnated fibers employ standard winding high-technology in combination with fiberglass or Kevlar preimpregnated rovings. Graphite rovings present specific problems due to their limited strength in shear when compared to Kevlar or fiberglass. Standard industry practice is to pull a roving through a winding eye. If a graphite preimpregnated roving is pulled over such a typical winding eye surface in an attempt to form a fiber band, resin tack-induced friction begins to cause the roving's outer fiber strands to be degraded, fuzz, or fail to shear. In a short period of time, considerable fiber fuzz and resin build-up occurs on the winding eye surface. The problem is compounded in the fiber delivery rate increases.

SUMMARY OF THE INVENTION

The present invention, therefore, is directed to an improved method and apparatus for the delivery of resin-impregnated, multifilament bands.

Briefly, according to the invention, a method for delivering a multifilament band comprises a first step of providing a plurality of rovings, with each roving being comprised of a bundle of resin-impregnated filaments. Each roving is then compacted to a predetermined width. The compacted rovings are guided to a side-by-side alignment such that a band of aligned rovings is formed.

Preferably, the step of compacting each roving comprises the first step of providing a plurality of cylindrical compaction backup rollers, with each compaction backup roller being mounted for rotation about an axially aligned shaft. Each of the provided rovings is guided past the radial face of one of the compaction backup rollers. A plurality of compaction rollers are provided, with each compaction roller being mounted for rotation about an axially aligned shaft. A predetermined force is applied to each compaction roller such that its radial face engages the roving guided past the radial face of a corresponding one of the compaction backup rollers, thereby compacting the roving to the predetermined width.

The step of guiding the compacted rovings to a side-by-side alignment preferably includes the step of providing a bandwidth adjustment assembly comprised of a plurality of predeterminedly spaced, parallel rollers. Each compacted roving is guided over 90 degrees of the radial face of each of the rollers such that the predetermined roller spacing causes the compacted rovings to emerge from the bandwidth adjustment rollers in a side-by-side alignment.

The bandwidth adjustment assembly preferably includes a baseplate having a plurality of parallel, transverse slots. Also provided is an adjustment bar, a plurality of roller shafts, and a plurality of positioning mechanisms. Each positioning mechanism is adapted to be fixed in position to the adjustment bar along the longitudinal axis thereof. Each positioning mechanism supports one of the roller shafts such that the longitudinal axis of each shaft is orthogonal to the longitudinal axis of the adjustment bar. The projecting end of each of the roller shafts is passed through one of the baseplate transverse slots. The rollers are mounted to the shafts on the side of the baseplate opposite the adjustment bar. The spacing between the rollers is controlled by rotating the adjustment bar with respect to the baseplate, thereby maintaining the roller-to-roller spacing in a direction parallel to the baseplate transverse slots while uniformly varying the roller-to-roller spacing in a direction orthogonal to the baseplate transverse slots.

The step of providing the rovings preferably includes providing an input roller matrix and a compaction roller guide matrix. Both the input roller matrix and the compaction roller guide matrix are comprised of a plurality of orthogonally positioned, predeterminedly spaced rollers. The input roller matrix is positioned such that the roving, as provided from a creel rack, is guided for routing past the radial face of the compaction backup rollers. The compaction roller guide matrix is positioned such that each roving is guided for routing past the central portion of the radial face of the compaction rollers.

The side-by-side aligned rovings are preferably passed over the surface of a final band delivery roller that positions the band for application to a receiving surface, such as the surface contours of a rotating mandrel.

The band is preferably wound onto the mandrel in an edge-to-edge alignment. The wound band may then be cured such that the resins impregnated in the filaments flow to form a unified structure.

Apparatus for delivering a multifilament band comprises a compaction means for compacting each of a plurality of rovings to a predetermined width, with each roving being comprised of a bundle of resin-impregnated filaments. An input guide routes each of the plurality of rovings to the compaction means. An output guide routes the compacted rovings to a side-by-side alignment such that a band of aligned rovings is formed.

Preferably, the compaction means is comprised of a plurality of cylindrical compaction backup rollers and a corresponding plurality of cylindrical compaction rollers, each compaction roller being predeterminedly aligned with one of the compaction backup rollers. An actuator controllably displaces the compaction rollers such that the radial faces thereof move with a predetermined compacting force in a direction to engage the radial faces of the compaction backup rollers. The input guide routes each roving past the radial face of one of the compaction backup rollers such that upon the actuator displacing the compaction rollers, each roving is compacted between one of the compaction rollers and the corresponding compaction backup roller to the predetermined width.

The output guide preferably comprises a bandwidth adjustment assembly including a plurality of predeterminedly spaced, parallel rollers. Each compacted roving is guided over 90 degrees of the radial face of the rollers, with the predetermined roller spacing causing the compacted rovings to emerge from the rollers in the side-by-side alignment.

The bandwidth adjustment assembly preferably includes a baseplate having a plurality of parallel, predeterminedly spaced transverse slots. An elongated adjustment bar is positioned underneath the baseplate. Each of a plurality of positioning mechanisms is adapted to be fixed in position to the adjustment bar along the longitudinal axis thereof. Each positioning mechanism supports one of a plurality of roller shafts such that the shaft projects from the elongated adjustment bar through one of the baseplate transverse slots and above the top surface of the baseplate. Each roller is mounted to, for rotation on, one of the roller shafts on the top surface of the baseplate. The spacing between the rollers is controlled by rotation of the adjustment bar with respect to the baseplate, thereby maintaining the roller-to-roller spacing in a direction parallel to the baseplate transverse slots, while uniformly varying the roller-to-roller spacing in a direction orthogonal to the baseplate transverse slots.

For applications wherein the rovings are provided by a creel rack which includes a plurality of spools of rovings, the input guide preferably includes an input roller matrix including a plurality of orthogonally positioned rollers. The input roller matrix is positioned such that each roving from the creel rack is routed past the radial face of one of the compaction backup rollers.

Further, a compaction roller guide matrix is provided, the compaction roller guide matrix including a plurality of orthogonally positioned, predeterminedly spaced rollers. The compaction roller guide matrix is positioned such that each roving is routed past the central portion of the radial face of one of the compaction rollers.

The output guide preferably includes a final band delivery roller that is positioned such that the band of side-by-side aligned rovings passes over the radial face of the final band delivery roller to thereby position the band for application to a receiving surface.

The aforedescribed delivery apparatus may be combined with apparatus for forming a filament-wound structure. Such apparatus includes a mandrel having a surface contoured to the desired shape of the filament-wound structure. Suitable means rotates the mandrel with respect to its longitudinal axis. Positioning apparatus controls the position of the multifilament band delivery system with respect to the mandrel such that the band of aligned rovings is wound in an edge-to-edge alignment over the contoured surface of the mandrel. The positioning apparatus preferably comprises numerically controlled machines. The edge-to-edge wound band is then, preferably, cured such that the resin impregnated in the filaments flows to form a unified structure.

BRIEF DESCRIPTION OF THE DRAWINGS

FIG. 2 is a perspective, front view of the roving delivery head and intermediate roving guide shown mounted to a numerically controlled carriage;

FIG. 3 is a perspective, front view illustrating the compaction rollers, compaction backup rollers, and the top surface of the bandwidth adjustment assembly;

FIG. 4 is a partial, perspective view illustrating an alternative embodiment of the compaction roller actuator which employs an actuator for each compaction roller;

FIG. 5 is a perspective view illustrating another alternative embodiment of the compaction roller actuator, wherein an air bag is inflated to apply pressure to each of the various compaction rollers;

FIG. 6 is a perspective view of the bandwidth adjustment assembly illustrating the use of micrometer adjustments;

FIGS. 7A and 7B are detailed partial views of a portion of the bandwidth adjustment assembly;

FIG. 8 is a top, plan view of the bandwidth adjustment assembly illustrating the relationship of roller spacing in direction both parallel and orthogonal to the baseplate transverse slots;

FIG. 9 is a perspective, free body view illustrating the various roving delivery head guiding and compacting components encountered by each roving as it is routed through the delivery system and applied to the mandrel; and FIG. 10 is a cutaway, front view of the roving delivery head and illustrates rotation of the delivery head to change the orientation of the produced aligned roving band.

DETAILED DESCRIPTION

Figure 1:
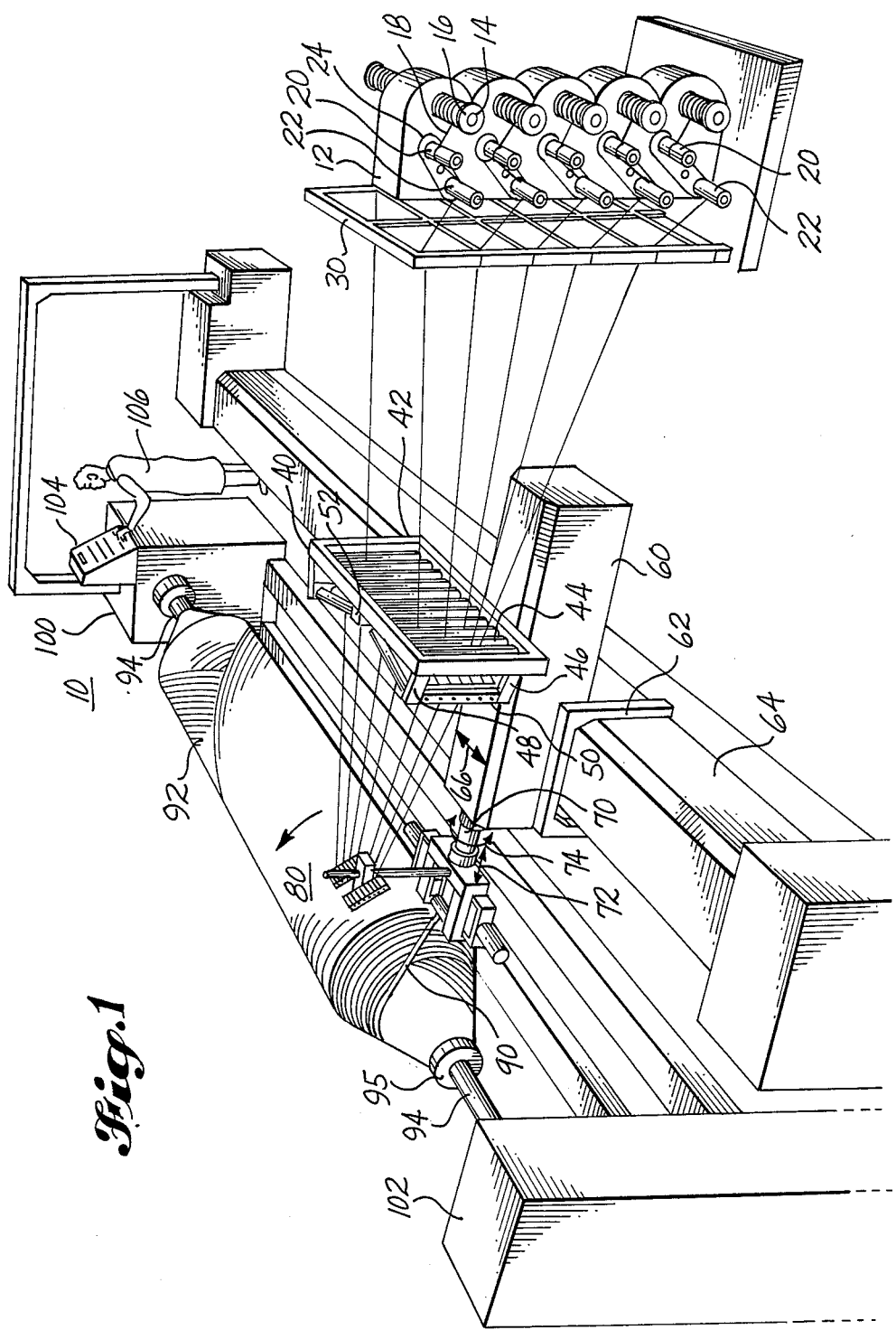
FIG. 1 is a perspective view illustrating the principal components of a composite material winding assembly including a rotating mandrel, a roving delivery head carried on a numerically controlled carriage, an intermediate roving guide, and a creel rack for supporting the roving spools.

FIG. 1 is a perspective view illustrating the principal components of the preferred composite material manufacturing apparatus, indicated generally at 10. Shown in a creel rack 12 of conventional design, having a number of shafts, such as shaft 14 for receiving spools, such as spool 16, of rovings, such as roving 18. For this, the preferred embodiment of the invention, the rovings 18 are comprised of a series of aligned filaments. The filaments may be made of graphite, carbon, fiberglass, boron, steel or other metals, man-made materials, such as Kevlar, or any combination thereof.

A resin or adhesive matrix holds the individual filaments in place within each roving. This matrix is preapplied to the individual rovings prior to the herein below described composite material forming process. In general, a thermoset or thermoplastic matrix resin is preapplied to the roving as a "prepreg."

In one preferred embodiment of the invention, each roving was comprised of between 1000 and 30,000 aligned filaments.

The creel rack 12, as shown in FIG. 1, is capable of holding up to ten spools 16, five on each side of the creel rack 12. Additional spools could be accomodated using a similar design.

The roving 18 off of each spool 16 is routed over the guide rollers, such as rollers 20, 22 of conventional tensioners, such as tensioner 24. The tensioners 24 maintain a set tension on the rovings 18, which aid in providing a uniform roving distribution. The roving 18 from each tensioner 24 exit through a corresponding opening in an output creel grid 30, which has horizontal and vertical sections as shown to maintain separation between the various rovings 18.

The rovings 18 then pass through an intermediate guide 40. Intermediate guide 40, shown in greater detail with respect to FIG. 2, is comprised of a rigid, rectangular frame 42, which supports a set of vertically oriented rollers, such as rollers 44. Each roving 18 is passed between a unique set of the rollers 44, thereby separating and aligning the rovings 18 in a vertical plane. Projecting from the corners of the frame 40 in the direction of roving travel are brackets, such as brackets 46, 48. The brackets 46, 48 support vertically standing members, such as member 50. The vertically standing members 50 serve as pivot supports for one end of a set of horizontally disposed rollers, such as roller 50.

The remaining ends of the rollers 50 pivotally engage a central vertically standing member 52 that is secured to the frame 42. The purpose of the rollers 50 is to align the rovings 18 in a horizontally disposed plane. Thus, the combined function of the vertically disposed rollers 44 and the horizontally disposed rollers 50 is to precisely maintain each roving within a defined vertical and horizontal "window" for subsequent routing to the roving delivery head, as described below.

The rollers 44, 50 are preferably formed of steel having a proprietary HMF-plated coating that is a process developed by Magneplate of Van Nuys, California. This plating has proved to be particularly resistant to degradation due to fuzz on the rovings. Alternatively, other well known synergistic coatings could be used. Each roller 44, 50 is journaled on a fixed steel shaft by means of conventional ball bearings to provide a long lasting and reliably performing roller assembly.

The intermediate roving guide frame 40 is affixed to the top surface of a carriage 60. Carriage 60 is supported by a guide 62, which rides over a bed 64 that rests on the floor of the manufacturing facility. Motors (not shown) within the carriage 60 allow the carriage to be precisely moved in either direction indicated by arrow 66 over the length of the bed 64.

Projecting from the front surface of the carriage 60 is a telescoping arm 70. Under the control of motors or mechanical cams (not shown) telescoping arm 70 varies its length, in a direction indicated by arrow 72, or rotates about its longitudinal axis, as indicated by arrow 74.

Attached to the end of the telescoping arm 70 is the roving delivery head, indicated generally at 80. The roving delivery head 80 is described in detail with respect to FIGS. 2 through 10 and, as such, will not be described in detail with respect to FIG. 1. However, the purpose of the roving delivery head 80 is to precisely route each roving for compaction by compaction rollers such that each roving is of a predetermined width. The rovings then emerge from the delivery head 80 in a side-by-side alignment, whereby they form an aligned roving band 90.

As illustrated in FIG. 1, the aligned roving band 90 is wound in an edge-by-edge alignment onto a mandrel 92. The mandrel 92 has a contoured surface corresponding to the desired shape to be fabricated. As shown in FIG. 1, mandrel 92 is formed as a cylinder, having a truncated cone at each end thereof.

Mandrel 92 is rotated on a shaft 94 that is rotatably driven by motors, not shown, contained within either vertically standing housing 100, or vertically standing housing 102, or both. The mandrel 92 is secured to the shaft 94, for rotation therewith, by means of spindles, such as spindle 95. The rotation rate of the mandrel 92 is controlled by a conventional numerically controlled machine, having a computer control panel as indicated at 104. An operator 106, by appropriate inputs to the computer control panel 104, also numerically controls the position of carriage 60 on the bed 64 (i.e., in either direction indicated by arrow 66). Also under numerical control is the telescoping extent of arm 70 (in the direction indicated by arrow 72) as well as the rotational displacement of telescoping arm 70 (as indicated by arrow 74). As is described in greater detail with respect to FIG. 10, the roving delivery head 80 is rotated as necessary to assure an appropriate edge-to-edge alignment of the band wound onto the surface contour of mandrel 92.

Numerically controlled equipment of the type illustrated in FIG. 1 is commercially available from several sources, including McClean Anderson, Milwaukee, Wisconsin.

In a manner described more fully herein below, the roving delivery head 80 is adaptable to position the band 90 in a band edge-to-edge alignment over any contoured surface that may be formed on mandrel 92. In this way, any desired structural shape may be formed by the disclosed technique.

In the course of forming a given structure, several layers of band 90 may be wound onto the mandrel 92. The angle with which the band 90 is wound onto the mandrel 92 may be used to align with anticipated stress lines in the resulting structure.

Upon completion of the winding process, the mandrel 92 is loaded into an autoclave (not shown) for curing. During the curing process, the resins impregnated in the rovings flow, thereby forming a unified structure after curing.

FIG. 2 is a front, perspective view illustrating the roving delivery head 80 mounted to the end of telescoping arm 70 on carriage 60. Carriage 60, in turn, rides on bed 64. Mounted to the top surface of carriage 60 is shown the intermediate guide 40 comprised on frame 42, vertically disposed rollers 44, projecting brackets 46, 48, which support a central vertical member 52, and the horizontal rollers 50 that mount between the vertical members 50 and the central vertical member 52.

The carriage 60, under computer control, displaces along the bed in a direction indicated by arrow 66. In addition, the telescoping arm 70 is operable to position the roving delivery head 80 in a direction indicated by arrow 72, and to rotate roving delivery head 80 in a direction indicated by arrow 74.

For purposes of illustration, a single roving 18 is shown being routed through a pair of horizontal rollers 50, and a pair of vertical rollers 44 to the roving delivery head 80.

Each roving 18 first passes through one of two input roller matrices 200, 202. The input roller matrices 200, 202 are rotatably supported on either side of a support block 204 by means of a shaft 206. The angular position of the input roller matrices 200, 202 is determined by rotation of the shaft 206 within the support block 204. The shaft 206 may be locked into position by securing means (not shown).

The support block 204 rides on a vertical shaft 210 that projects upwardly from the base 212 of the roving delivery head 80. The support block 204, and correspondingly the input roller matrices 200, 202, are vertically positioned via support block 204, which is locked into position on shaft 210 by means of a locking bolt 214.

Each input roller matrix 200, 202 includes a rigid rectangular frame 220. Frame 220 houses a series of horizontal rollers, such as horizontal roller 222, and a pair of vertically disposed rollers, such as roller 224, shown in partial cutaway view. The horizontal rollers 222 and vertical rollers 224 are preferably journalled by means of ball bearings, or a bronze sleeve, on provided shafts (not shown), which secure to the frame 220. The surface of the rollers is preferably a proprietary HMF coating, as described above, or another type of synergistic coating, to avoid roller surface degradation due to the abrasive fibers which project from the roving 18 and eliminate resin wipe-off and build-up. By passing each roving 18 through a pair of horizontally disposed rollers 222 and a pair of vertically disposed rollers 224, each roving is predetermined routed to a compaction roller in the base 212 of roving delivery head 80 structure, as described below.

After passing through the input roller matrices 200, 202, the rovings are guided through a pair of compaction roller guide matrices 230, 232. The compaction roller guides matrices 230, 232 are similar in construction to the input roller matrices 200, 202. Thus, each compaction roller guide matrix 230, 232 includes a rigid, rectangular frame 240 that houses a plurality of transverse shafts for rotatably supporting transverse disposed rollers 242 and a pair of longitudinally disposed shafts for supporting longitudinally disposed rollers, such as roller 244 (shown in cutaway cross section). As with the input roller matrices 200, 202, the transverse rollers 242 and the longitudinal rollers 244 are formed on a hardened material, such as HMF-treated steel, and are journalled by means of ball bearings (or bronze sleeves) to minimize friction between each roving and the rollers 242, 244.

Each roving 18 is routed through a pair of transverse rollers 242 and the longitudinal rollers 244 such that the rovings are centered on the compaction rollers, as described hereafter.

Each roving 18 is then routed underneath a corresponding one of a plurality of compaction backup and guide rollers, such as compaction backup and guide roller 250. A similar set of compaction rollers (not shown) is positioned underneath the second compaction roller guide matrix 232. The compaction backup and guide rollers 250 are cylindrical, and are equidistantly positioned on a common shaft (not shown) for rotation thereon. The shafts are secured within the base 212 of the roving delivery head 80. Positioned in alignment behind each compaction backup and guide roller 250 is a corresponding compaction roller, such as compaction roller 254. The compaction rollers 254 are also cylindrical and, in the embodiment shown in FIG. 2, are equidistantly spaced on a common shaft (not shown). The compaction roller 254 shaft is secured to a rigid frame 256 that is slidable within the outer frame 258 of the base 212. An air cylinder 260 is secured to the outer frame 258 of the base 212. A piston shaft 264 of the air cylinder 260 projects through an opening in the base frame 258 and is attached to the back of the compaction roller frame 256. Air pressure is supplied to the air cylinder 260 by means of a connection hose 270. The air pressure is monitored via a provided gauge 272.

Upon application of a predetermined pressure to the air cylinder 260, the piston shaft 264 deflects inwardly, tending to cause the radial face of the compaction rollers 254 to engage the radial face of the compaction backup and guide rollers 250. As a result, each roving is compacted to a desired width and thickness, as determined by the level of air pressure applied. In this way, each roving exiting the compaction rollers 254 and compaction backup and guide rollers 250 is of a desired width and thickness. Adjustable mechanical stops (not shown) may be incorporated to set the minimum thickness or gap between the compaction rollers 254 and the compaction backup and guide rollers 250.

Each roving 18, now of a predetermined width, exits from the compaction backup and guide rollers 250 and enters the bandwidth adjustment mechanism, indicated generally at 290. Bandwidth adjustment mechanism 290, described in greater detail with respect to FIGS. 6 and 7, comprises a plurality of rollers 292 that rotate on shafts which project upwardly from the baseplate 294. In a manner described hereinbelow, the rollers 292 are positioned such that each roving exits from one of the compaction backup and guide rollers 250 and is routed around 90 degrees of one of the bandwidth adjustment rollers 292. The spacing between the bandwidth adjustment rollers 292 is such that the rovings 18 emerge from the bandwidth adjustment rollers 292 is side-by-side alignment, thereby forming a band 90. The band 90 is routed underneath a transversely mounted final delivery roller 296. The function of final delivery roller 296 is to route the band 90 to the surface of the mandrel (FIG. 1).

The material selected for the compaction backup and guide rollers 250, compaction rollers 254, the bandwidth adjustment rollers 292, and the final band delivery roller 296 is HMF-plated steel.

FIG. 3 is a front, perspective view of the roving delivery head base 212 with the compaction roller guide matrices removed to better illustrate the compaction mechanism. Shown projecting from the base 212 is the vertical support shaft 210.

Shown are two rows of compaction backup and guide rollers 250. The compaction backup and guide rollers 250 all rotate on common shafts 310, 312 that are secured within the base 212. Directly behind the compaction backup and guide rollers 250 are corresponding compaction rollers 254 that, in this embodiment, all ride on a common shaft (not shown). The compaction rollers 354 are equidistantly spaced by means of cylindrical spacers 320, 322. The shaft that supports the compaction rollers 254 is secured within a rigid frame 256 that is slidable within the base frame 258. Air cylinders 260 are secured to the base frame 258, and have piston shafts 264 that project through provided holes in base frames 258 and are secured to the inner frames 256. Upon application of air pressure to the air cylinders 260, the compaction rollers 254 (and their corresponding shaft) are driven in a direction such that radial faces of the compaction rollers 254 tend to engage the radial faces of the compaction backup and guide rollers 250. Inasmuch as each roving is routed between these radial faces, the rovings are then compacted to a width and thickness as determined by the applied air pressure.

After individual compaction, the rovings exit the compaction backup and guide rollers 250 and are routed around 90 degrees of provided bandwidth adjust rollers 292. The position of the bandwidth adjust rollers 292 is designed such that alignment of each roving from each compaction backup and guide roller 250 to the corresponding bandwidth adjust roller 292 is maintained, whereas, as the rovings emerge from the bandwidth adjust rollers 292, they are in a side-by-side alignment forming a band.

This band then is routed underneath the final band delivery roller 296 that rotates on a shaft (not shown) supported by the base 212. The final band delivery roller 296 aids in guiding the band to the mandrel surface.

A particular feature of the present invention is that each individual roving is compacted to a desired width, and, preferably, a desired thickness, prior to the formation of the roving-aligned band. In this way, by controlling the emerging spacing of the rovings from the bandwidth adjustment assembly, a uniform band, containing no gaps or overlaps is formed. The degree to which each roving is compacted is related to the applied air pressure to the air cylinders as shown in FIGS. 2 and 3. As shown, the air cylinders apply a pressure that is transmitted to a frame that then transmits the force through a shaft to each of the compaction rollers. In practice, it was found that system tolerances prevent all rovings from being compacted to exactly the same design width using the system illustrated in FIGS. 2 and 3. To overcome this problem, the improved system of FIG. 4 was developed.

Referring to FIG. 4, shown is a roving 18 that is guided to the central portion of the compaction backup and guide roller 250 by means of a compaction roller guide matrix, here shown as free-floating transverse rollers 242 and longitudinal rollers 244. Now, however, rather than a common force being imparted to each compaction roller 254, each compaction roller is supported on its own unique shaft, shown in end view at 410, with each shaft 410 being supported in its own movable frame 412. Attached to the end of the frame 412 is the piston shaft 414 from an air cylinder 416. The body of air cylinder 416 would, as with FIGS. 2 and 3, be attached to the base of the roving delivery head. Now, however, each compaction roller 254 is actuated by a single one of a plurality of such air cylinders 416. In this way, the air pressure applied to each air cylinder 416 may be precisely controlled such that the corresponding roving 18 is compacted to its desired width and thickness. By the use of individual air cylinders, system tolerances can be accounted for on an individual basis, whereby a uniform roving-to-roving compacted width is assured.

FIG. 5 is a perspective view of yet a further embodiment of the roving compaction mechanism. Here, as before, a plurality of compaction backup and guide rollers 250 and compaction rollers 254 are provided. Now, however, each compaction roller 254 rides on its own shaft, such as shown in end view 556. Each shaft 556 is supported across one end of a channel bracket, such as channel bracket 560. The channel brackets 560 pivot at their remaining ends about pivot pins, such as pivot pin 562, that are secured to the roving delivery head base (not shown). Positioned directly behind each pivoting channel bracket 560 is an air bladder, or bag, 570. The air bag 570, often referred to as a windjammer, is wedged between the channel brackets 560 and a backing plate 563 that is rigidly secured to the roving delivery head base.

Upon application of air pressure to the air bag 570, air bag 570 predeterminedly inflates, applying a corresponding pressure to the back of each channel bracket 560. This causes each channel bracket 560 and compaction roller 254 radial face to displace in a direction to compact the corresponding roving against the associated compaction backup and guide roller 250. An adjustable mechanical stop 565 is set to limit the travel of each channel bracket 560, thereby determining the minimum allowable thickness of each roving.

The inflatable air bag 570 embodiment of FIG. 5 allows the various compaction rollers 254 to move independently, thereby providing compensation for system tolerances and producing a more uniform roving-to-roving compacted width as compared to the embodiments shown in FIGS. 2 and 3.

FIG. 6 is a perspective, free-body illustration of the bandwidth adjustment mechanism 290. The bandwidth adjustment mechanism 290 includes a generally rectangular baseplate 290 including a plurality of parallel, transverse slots, such as slot 610. A transverse slot 610 is provided for each pair of bandwidth adjust mechanism rollers 294 employed. In the embodiment illustrated, a total of ten bandwidth adjust rollers 294 are used (two groupings of five each), whereby a total of five transverse slots 610 are formed. As understood more fully with respect to FIG. 8, the spacing between the transverse slots 610 is selected to correspond to the spacing between the compaction backup and guide rollers.

Each of the bandwidth adjust rollers 294 is supported on one of a pair of adjustment bars 612, 614 that are positioned under the bottom of the baseplate 294.

By rotation of the adjustment bars 612, 614 with respect to the baseplate 294, the relative spacing between the bandwidth adjust rollers 294, in a direction orthogonal to the transverse slots 610 may be controlled. As described above, this spacing is selected such that the emerging compacted rovings are aligned in a side-by-side alignment thereby forming a continuous ribbon, or band.

Precise positioning of the adjustment bars 612, 614 is provided at one end thereof by a pair of positioning micrometers 620, 622, respectively.

FIG. 7A is a perspective, cutaway view illustrating the relationship between the baseplate 294, having a provided transverse slot 610, a bandwidth adjust roller 292, the adjustment bar 612, and the positioning micrometer 620. More specifically, the adjustment bar 612 is provided with a longitudinal slot 710. A positioning mechanism, indicated generally at 720, associated with each of the bandwidth adjust rollers 292 is used to affix each bandwidth adjust roller 292 in position along adjustment bar 612 by means of the longitudinal slot 710. More specifically, the bandwidth adjust roller 292 is journalled via a pair of upper and lower ball bearing races 730, 732, respectively, to a shaft 734. A retaining clip 740 engages a circumferential groove 742 at the top of shaft 734 to prevent bandwidth adjust roller 292 from riding over the top of the shaft 734. At its lower end, the bandwidth adjust roller 292 rides on a bushing 750 that separates the bandwidth adjust roller 292 from the top surface of the baseplate 294. Shaft 734 projects downwardly through the transverse slot 610 in baseplate 294 and the longitudinal slot 710 in adjustment bar 612 and attaches to the base portion of a fixture slide 751. The fixture slide 751 is formed with channel shaped end brackets 751a, 751b, which slide over milled steps 612a, 612b, formed in the upper surface of adjustment bar 612. In this way, upon rotation of the adjustment bar 612, as described below, the fixture slides 751, shafts 734 and bandwidth adjustment rollers 292 are free to slide along adjustment bar 612 into proper position as determined by the transverse slots 610.

FIG. 7B is a front, cutaway view of the assembly shown in FIG. 7A. Shown in partial view is the shaft 734 which extends through bushing 750 and transverse slot 610 of baseplate 294 and attaches to the base portion of fixture slide 751. Channel brackets 751a, 751b at each end of the fixture slide 751 are free to slide over milled steps 612a, 612b, respectively, formed in the upper surface of the adjustment bar 612.

Referring again to FIG. 7A, the jaws 760 of adjustment linkage, indicated generally at 762, attach to a positioning micrometer 620. By proper adjustment of the positioning micrometer 620, the adjustment bar 612 and, correspondingly, the bandwidth adjust rollers 292 may be rotated into fixed position with respect to the baseplate 294.

Similarly, a positioning micrometer 770 may be attached to the remaining end of adjustment bar 612 to control its relative position.

FIG. 8 is a top view of the right-hand half of the bandwidth adjustment mechanism 290. Shown are the rovings, such as roving 18, that are routed from the center of the compaction backup and guide rollers, such as compaction backup and guide roller 250. The spacing of the transverse slots 610, as well as the diameter of the bandwidth adjust rollers 292, along with the positioning of the bandwidth adjustment plate 294 are such that the rovings 18 continue on a straight line from the compaction backup and guide rollers 250 to the circumference of a corresponding one of each of the bandwidth adjust rollers 292. Each roving 18 continues around 90 degrees of each bandwidth adjust roller 292, and is then routed in a direction orthogonal to the transverse slots 610 as shown and fed to the final band delivery roller 296.

The relative spacing of the rovings 18 entering the bandwidth adjustment mechanism 290 in a direction parallel to the transverse slots 610 is indicated by distances $x_1$, $x_2$, $x_3$, and $x_4$. The relative spacing between the rovings emerging from the bandwidth adjustment mechanism 290 is indicated as $y_1$, $y_2$, $y_3$, and $y_4$. It will be noted that as the bandwidth adjustment bar 612 (shown partially in dotted line) is rotated through an angle $\theta$ the spacings $x_1$–$x_4$ do not vary due to the fixed spacing of the transverse slots 610. This assures a constant alignment of each roving 18 from a compaction backup and guide roller 250 to the corresponding adjustment roller 292.

However, a changing angle $\theta$ varies the spacing $y_1$–$y_4$ between the rovings as they emerge from the bandwidth adjustment mechanism 290. The relative spacings $y_1$–$y_4$ are uniform for any given angular displacement $\theta$ of the adjustment bar 612.

Thus, the bandwidth adjustment mechanism 290 according to the present invention allows a simple, yet precise means for guiding the rovings, each of which having been previously compacted to a defined width, to a side-by-side alignment, thereby forming a band having no gaps or overlaps.

FIG. 9 is a free-body diagram illustrating the processing of a roving through the roving delivery head, and depicts each of the guiding and compacting surfaces the roving encounters prior to forming, with the other compacted rovings, an aligned roving band.

Referring to FIG. 9, an input roving 18 is guided by horizontal 222 and vertical 224 rollers of an input roller matrix such that it is routed to pass by the radial face of a cylindrical compaction backup and guide roller 250. A compaction roller guide matrix, including transverse rollers 242 and longitudinal rollers 244, further aligns the roving 18 such that it passes over the central portion of the compaction backup and guide roller 250.

The roving 18 is compacted to a predetermined width and thickness between the radial faces of the compaction backup and guide roller 250 and the compaction roller 254. The compaction force applied to the compaction roller 254 is transmitted through a frame 412 to a piston shaft 414 that extends from air cylinder 416.

The compacted roving is then passed around 90 degrees of the vertical standing bandwidth adjustment roller 292 that is aligned with the remaining bandwidth adjustment rollers (not shown), such that the compacted roving 18 emerges in a side-by-side alignment with the other compacted rovings.

The aligned, compacted rovings pass under the final bandwidth delivery roller 296 and are wound onto the rotating mandrel 92 in an edge-to-edge relationship with a previously wound band.

FIG. 10 is a front, partial cutaway view of the roving delivery head 80. Shown are the input roller matrices 200, 202 that mount via a shaft 206 to a support block 204 secured to a vertically standing shaft 210. Directly below the input roller matrices 200, 202, and mounted to the base 212 are the compaction roller guide matrices 230, 232, respectively. In this cutaway view, illustrated are transverse rollers 242 and the ends of longitudinal rollers 244.

The compaction roller guide matrices 230, 232 direct each roving to pass by the central portion of the radial faces of compaction backup and guide rollers, here shown in the cutaway view at 250. The rovings are compacted between the radial faces of the compaction backup and guide rollers 250 and the compaction rollers 254. The compaction rollers 254 are supported on frames 412 that are driven in a direction to engage the radial face of the compaction backup and guide rollers 250 by means of a piston shaft 414. Piston shaft 414 displaces in response to air pressure applied to each air cylinder 416.

The compacted rovings then pass through the bandwidth adjustment mechanism 290 that is comprised of a plurality of bandwidth adjust rollers 292. The bandwidth adjust rollers 292 are positioned by means of adjustment bars 612, 614 that rotate with respect to the baseplate 294. The position of the adjustment bars 612, 614 is precisely controlled by means of positioning micrometers 620, 622, which, via suitable linkage 762, connect to the ends of the adjustment bars 612, 614.

By compacting each roving to a defined width and thickness, and by selecting the spacing of the bandwidth adjust rollers 292, the rovings emerge from the bandwidth adjustment mechanism 290 in a side-by-side aligned band. This band is then routed under a final bandwidth delivery roller (not shown) and delivered to a receiving surface, such as the contoured surface of the rotating mandrel of FIG. 1.

The entire delivery head 80 is rotatable, through an indicated angle α, to deliver the aligned roving band at a desired orientation to conform to a contoured surface and fiber orientation. The rotational axis for angle α should pass tangent to the bottom of the final bandwidth delivery roller or coincident with the central fiber path going onto the final roller for best results. In this way, the buckling and other disadvantages known to prior art composite material manufacturing techniques are avoided.

In summary, an improved method and apparatus for delivering a resin-impregnated, multifilament band has been described.

While a preferred embodiment of the invention has been described in detail, it should be apparent that many modifications and variations thereto are possible, all of which fall within the true spirit and scope of the invention.

The embodiments of the invention in which an exclusive property or privilege is claimed are defined as follows:

1. A method for delivering a multifilament band comprising the steps of:
   (a) providing a plurality of rovings, each roving being comprised of a bundle of resin impregnated filaments;
   (b) compacting each roving to a predetermined width, said compacting step including the steps of:
      (i) providing a plurality of cylindrical compaction backup rollers, each compaction backup roller being mounted for rotation about a shaft;
      (ii) guiding each of said provided rovings past the radial face of one of said compaction backup rollers;
      (iii) providing a plurality of compaction rollers, each compaction roller being mounted for rotation about an axially aligned shaft; and
      (iv) applying a predetermined, individually adjustable force to each compaction roller such that the radial face thereof engages the roving guided past the radial face of one of said compaction backup rollers such that said roving is compacted between said radial faces to said predetermined width; and
   (c) guiding said compacted rovings to a side-by-side alignment such that a band of aligned rovings is formed.

2. The method of claim 1 comprising the further steps of:
   providing said compaction rollers equidistantly spaced on a common shaft; and
   applying said predetermined force to said shaft to thereby cause the radial faces of said compaction rollers to engage and compact said rovings.

3. The method of claim 1 comprising the further steps of:
   providing an air cylinder having a member which displaces in response to applied air pressure;
   linking said air cylinder member to said compaction roller common shaft such that upon air pressure being applied to said air cylinder said force is applied to said common shaft; and
   applying a predetermined level of air pressure to said air cylinder.

4. The method of claim 1 comprising the further steps of:
   providing a plurality of shafts;
   mounting each compaction roller to one of said shafts; and
   providing actuation means for applying said force to each of said shafts to thereby cause the radial faces of said compaction rollers to engage and compact said rovings.

5. The method of claim 4 comprising the further steps of:
   providing a plurality of air cylinders, each air cylinder having a member which displaces in response to an applied air pressure;
   linking said member of each of said air cylinders to one of said shafts; and
   applying a controlled air pressure to each air cylinder to thereby compact each of said rovings to a predetermined width.

6. The method of claim 4 comprising the further steps of:
   providing an air bag, said air bag being predeterminedly inflatable in response to applied air pressure;
   linking said shafts to said air bag such that upon air pressure being applied to said air bag, said compaction rollers engage and compact said rovings; and
   applying a controlled air pressure to said air bag.

7. The method of claim 1 wherein step (c) comprises the further steps of:
   (i) providing a bandwidth adjustment assembly, said bandwidth adjustment assembly comprising a plurality of predeterminedly spaced, parallel rollers; and
   (ii) guiding each compacted roving over 90° C. of the radial face of each of said rollers, such that said predetermined roller spacing causes said compacted rovings to emerge from said rollers in said side-by-side alignment.

8. The method of claim 7 wherein the step of providing said bandwidth adjustment assembly comprises the steps of:
   providing a baseplate having a plurality of parallel, transverse slots;
   providing an adjustment bar;
   providing a plurality of shafts;

providing a plurality of positioning mechanisms, each positioning mechanism adapted to be fixed in position to said adjustment bar along the longitudinal axis thereof, each positioning mechanism supporting one of said shafts such that the longitudinal axis of each shaft is orthogonal to the longitudinal axis of said adjustment bar;

passing the projecting end of each of said shafts through one of said baseplate transverse slots;

mounting each roller to one of said shafts on the side of said baseplate opposite said adjustment bars; and controlling the spacing between rollers by rotating said adjustment bar with respect to said baseplate, thereby maintaining the roller-to-roller spacing in a direction parallel to said baseplate transverse slots while uniformly varying the roller-to-roller spacing in a direction orthogonal to said baseplate transverse slots.

9. The method of claim 1 wherein step (c) comprises the further steps of:
(i) providing a bandwidth adjustment assembly, said bandwidth adjustment assembly comprising a plurality of predeterminedly spaced, parallel adjustment rollers; and
(ii) positioning said bandwidth adjustment assembly with respect to said compaction backup rollers such that each compacted roving from each compaction backup roller is routed around 90° C. of one of said adjustment rollers, said spacing between said adjustment rollers causing said compacted rovings to emerge from said adjustment rollers in side-by-side alignment.

10. The method of claim 9 wherein the step of providing said bandwidth adjustment assembly comprises the steps of:

providing a baseplate having a plurality of parallel, transverse slots;

providing an adjustment bar;

providing a plurality of adjustment roller shafts;

providing a plurality of positioning mechanisms, each positioning mechanism adapted to be fixed in position to said adjustment bar along the longitudinal axis thereof, each positioning mechanism supporting one of said adjustment roller shafts such that the longitudinal axis of each said shaft is orthogonal to the longitudinal axis of said adjustment bar;

passing the projecting end of each of said adjustment roller shafts through one of said baseplate transverse slots;

mounting each adjustment roller to one of said adjustment roller shafts on the side of said baseplate opposite said adjustment bar; and controlling the spacing between adjustment rollers by rotating said adjustment bar with respect to said baseplate, thereby maintaining the adjustment roller-to adjustment roller spacing in a direction parallel to said baseplate slots while uniformly varying the adjustment roller-to-adjustment roller spacing in a direction orthogonal to said baseplate transverse slots.

11. The method of claim 1 wherein step (a) comprises the further steps of:
(i) providing a creel rack including a plurality of spools of rovings;
(ii) providing an input roller matrix, said input roller matrix comprising a plurality of orthogonally positioned rollers; and
(iii) positioning said input roller matrix such that each roving from said creel rack is guided for routing past the radial face of one of said compaction backup rollers.

12. The method of claim 1 wherein step (a) comprises the further steps of:
(iv) providing a compaction roller guide matrix, said compaction roller guide matrix comprising a plurality of orthogonally positioned, predetermined spaced rollers; and
(v) positioning said compaction roller guide matrix proximate to said compaction backup rollers such that each roving is guided for routing past the central portion of the radial face of one of said compaction rollers.

13. The method of claim 1 wherein step (c) comprises the further steps of:
(i) providing a final band delivery roller; and
(ii) positioning said final band delivery roller such that said band of side-by-side aligned rovings pass over the radial face thereof to thereby position said band for application to a receiving surface.

14. The method of claim 7 wherein step (c) comprises the further steps of:
(iii) providing a final band delivery roller; and
(iv) positioning said final band delivery roller such that said band of side-by-side aligned rovings pass over the radial face thereof to thereby position said band for application to a receiving surface.

15. The method of claim 9 wherein step (c) comprises the further steps of:
(iii) providing a final band delivery roller; and
(iv) positioning said final band delivery roller such that said band of side-by-side aligned rovings pass over the radial face thereof to thereby position said band for application to a receiving surface.

16. The method of claim 11 wherein step (c) comprises the further steps of:
(i) providing a final band delivery roller; and
(ii) positioning said final band delivery roller such that said band of side-by-side aligned rovings pass over the radial face thereof to thereby position said band for application to a receiving surface.

17. The method of claim 12 wherein step (c) comprises the further steps of:
(i) providing a final band delivery roller; and
(ii) positioning said final band delivery roller such that said band of side-by-side aligned rovings pass over the radial face thereof to thereby position said band for application to a receiving surface.

18. The method of claim 1 in combination with a method for forming a filament wound structure comprising the further steps of:
(d) providing a mandrel having a surface contoured to the desired shape of said filament wound structure;
(e) rotating said mandrel with respect to its longitudinal axis; and
(f) winding said band of aligned rovings onto said mandrel such that said band is wound edge-to-edge over the contoured surface of said mandrel.

19. The method of claim 18 including the further step of:
(g) curing said edge-to-edge wound band such that the resins impregnated in said filaments flow to form a unified structure.

20. Apparatus for delivering a multifilament band comprising:

compaction means for compacting each of a plurality of rovings to a predetermined width, with each roving being comprised of a bundle of resin impregnated filaments, said compaction means comprising:

a plurality of cylindrical compaction backup rollers;

a plurality of cylindrical compaction rollers, each compaction roller being predeterminedly aligned with one of said compaction backup rollers;

actuating means for controlling individually displacing said compaction rollers such that the radial faces thereof moves with a predetermined compacting force in a direction to engage the radial faces of said compaction backup rollers; and input guide means for guiding each of said plurality of rovings to said compaction means; said input guide means including guides for routing each roving past the radial face of one of said compaction backup rollers, such that upon said actuating means displacing said compaction rollers, each roving is compacted between one of said compaction rollers and one of said backup compaction rollers to said predetermined width; and output guide means for guiding said compacted rovings to a side-by-side alignment such that a band of aligned rovings is formed.

21. The apparatus of claim 20 wherein said compaction means further comprises:

said compaction roller being equidistantly spaced on a common shaft; and said actuating means applying said compacting force to said common shaft to thereby displace said compaction rollers.

22. The apparatus of claim 21 wherein said compaction means further comprises:

said actuating means including:

an air cylinder having a member which displaces in response to applied air pressure, and linkage means for linking said air cylinder member to said common shaft, whereby upon air pressure being applied to said air cylinder, said air cylinder member displaces applying said compacting force to said common shaft and said compaction rollers.

23. The apparatus of claim 20 wherein said compaction means further comprises:

a plurality of compaction rollers shafts;

each compaction roller being mounted to, for rotation about, one of said shafts; and said actuating means applies said predetermined compacting force to each of said compaction roller shafts.

24. The apparatus of claim 23 wherein said compaction means further comprises:

said actuating means comprising a plurality of air cylinders, each air cylinder having a member which displaces in response to applied air pressure and linkage means for linking said member of each of said air cylinders to one of said compaction roller shafts, whereby upon air pressure being applied to said air cylinders, each of said air cylinder members displaces and applies said compacting force to each of said compaction roller shafts and each of said compaction rollers.

25. The apparatus of claim 23 wherein said compaction means further comprises:

an air bag being predeterminedly inflatable in response to applied air pressure; and linkage means for linking said compaction roller shafts to said air bag such that upon air pressure being applied to said air bag, said predetermined compacting force is applied to said compaction roller shafts and to said compaction rollers.

26. The apparatus of claim 25 wherein said linkage means comprises:

a plurality of channel brackets;

each compaction roller being mounted to said compaction roller shaft at a first end of one of said channel brackets;

each of said channel brackets being pivotally mounted at a second end; and wherein said air bag is disposed with respect to said channel brackets such that upon air pressure being applied to said air bag, said air bag applies a force to said channel brackets pivoting the same about their pivot second ends thereby causing said compaction rollers to pivotally displace and compact said rovings.

27. The apparatus of claim 20 wherein said output guide means comprises:

a bandwidth adjustment assembly comprising a plurality of predeterminedly spaced, parallel rollers; and guide means for guiding each compacted roving over 90° C. of the radial face of each of said rollers, said predetermined roller spacing causing said compacted rovings to emerge from said rollers in said side-by-side alignment.

28. The apparatus of claim 27 wherein said bandwidth adjustment assembly comprises:

a baseplate having a plurality of parallel, predetermined spaced transverse slots;

an elongated adjustment bar positioned underneath said baseplate;

a plurality of roller shafts;

a plurality of positioning mechanisms, each positioning mechanism adapted to be fixed in position to said adjustment bar along the longitudinal axis thereof, each positioning mechanism supporting one of said roller shafts such that said shaft projects from said elongated adjustment bar through one of said baseplate transverse slots and above the top surface of said baseplate; and each of said rollers being mounted to, for rotation about, one of said roller shafts on the top surface of said baseplate, the spacing between rollers being controlled by rotation of said adjustment bar with respect to said baseplate, thereby maintaining the roller-to-roller spacing in a direction parallel to said baseplate transverse slots while uniformly varying the roller-to-roller spacing in a direction orthogonal to said baseplate transverse slots.

29. The apparatus of claim 20 wherein said output guide means comprises:

a bandwidth adjustment assembly comprising a plurality of predeterminedly spaced, parallel adjustment rollers, said bandwidth adjustment assembly being positioned with respect to said compaction backup rollers such that each compacted roving from each compaction backup roller is routed around 90° C. of one of said adjustment rollers, said spacing between said adjustment rollers causing said compacted rovings to emerge from said adjustment rollers in a side-by-side alignment.

30. The apparatus of claim 29 wherein said bandwidth adjustment assembly comprises:
a baseplate having a plurality of parallel, predeterminedly spaced transverse slots;
an elongated adjustment bar positioned underneath said baseplate;
a plurality of adjustment roller shafts; and
a plurality of positioning mechanisms, each positioning mechanism adapted to be fixed in position to said adjustment bar along the longitudinal axis thereof, each positioning mechanism supporting one of said adjustment roller shafts such that said shaft projects from said elongated adjustment bar through one of said baseplate transverse slots and along the top surface of said baseplate;
each of said adjustment rollers being mounted to, for rotation about one of said adjustment roller shafts on the top surface of said baseplate,
the spacing between adjustment rollers being controlled by rotation of said adjustment bar with respect to said baseplate, thereby maintaining the adjustment roller-to-adjustment roller spacing in a direction parallel to said baseplate transverse slots while uniformly varying the adjustment roller-to-adjustment roller spacing in a direction orthogonal to said baseplate transverse slots.

31. The apparatus of claim 20 wherein said rovings are provided by a creel rack which includes a plurality of spools of rovings, said input guide means comprising:
an input roller matrix including a plurality of orthogonally positioned rollers, said input roller matrix being positioned such that each roving from said creel rack is routed past the radial face of one of said compaction backup rollers.

32. The method of claim 31 wherein said input guide means further comprises:
a compaction roller guide matrix, said compaction roller guide matrix including a plurality of orthogonally positioned, predeterminedly spaced rollers, said compaction roller guide matrix being positioned such that each roving is routed past the central portion of the radial face of one of said compaction rollers.

33. The apparatus of claim 20 wherein said output guide means comprises:
a final band delivery roller, said final band delivery roller being positioned such that said band side-by-side aligned rovings pass over the radial face thereof to thereby position said band for application to a receiving surface.

34. The apparatus of claim 27 wherein said output guide means comprises:
a final band delivery roller, said final band delivery roller being positioned such that said band side-by-side aligned rovings pass over the radial face thereof to thereby position said band for application to a receiving surface.

35. The apparatus of claim 28 wherein said output guide means comprises:
a final band delivery roller, said final band delivery roller being positioned such that said band of side-by-side aligned rovings pass over the radial face thereof to thereby position said band for application to a receiving surface.

36. The apparatus of claim 30 wherein said output guide means comprises:
a final band delivery roller, said final band delivery roller being positioned such that said band of side-by-side aligned rovings pass over the radial face thereof to thereby position said band for application to a receiving surface.

37. The apparatus of claim 31 wherein said output guide means comprises:
a final band delivery roller, said final band delivery roller being positioned such that said band of side-by-side aligned rovings pass over the radial face thereof to thereby position said band for application to a receiving surface.

38. The apparatus of claim 32 wherein said output guide means comprises:
a final band delivery roller, said final band delivery roller being positioned such that said band of side-by-side aligned rovings pass over the radial face thereof to thereby position said band for application to a receiving surface.

39. The apparatus of claim 20 in combination with apparatus for forming a filament wound structure comprising:
a mandrel having a surface contoured to the desired shape of said filament wound structure;
means for rotating said mandrel with respect to its longitudinal axis; and
positioning means for controlling the position of said apparatus for delivering a multifilament band with respect to said mandrel such that said band of aligned rovings is wound in an edge-to-edge alignment over the contoured surface of said mandrel.

40. The apparatus of claim 39 wherein said positioning means comprises:
a numerically controlled machine for automatically positioning said apparatus for delivering a multifilament band with respect to said rotating mandrel such that said band is wound in edge-to-edge alignment on said mandrel.

41. The apparatus of claim 39 further comprising:
means for curing said edge-to-edge wound band such that the resins impregnated in said filaments flow to form a unified structure.

42. The apparatus of claim 40 further comprising:
means for curing said edge-to-edge wound band such that the resins impregnated in said filaments flow to form a unified structure.

* * * * *